United States Patent [19]
Sato et al.

[11] 3,987,765
[45] Oct. 26, 1976

[54] RESIDUAL GAS CONTROL APPARATUS FOR INTERNAL COMBUSTION ENGINES HAVING AUXILIARY COMBUSTION CHAMBERS

[75] Inventors: Yasuhito Sato, Kamifuoka; Yoshitoshi Sakurai, Kawasaki; Kazuo Inoue, Tanashi; Shizuo Yagi, Asaka, all of Japan

[73] Assignee: Honda Giken Kogyo Kabushiki Kaisha, Tokyo, Japan

[22] Filed: Dec. 16, 1974

[21] Appl. No.: 533,222

[52] U.S. Cl. ........................ 123/32 SP; 123/32 SA; 123/191 SP; 123/75 B
[51] Int. Cl.² ................. F02B 19/10; F02B 3/00; F02B 19/18
[58] Field of Search ......... 123/32 ST, 32 SP, 191 S, 123/191 SP, 75 B, 32 SA

[56] References Cited
UNITED STATES PATENTS

| | | | |
|---|---|---|---|
| 2,422,610 | 6/1947 | Bagnuco | 123/32 SP |
| 2,435,659 | 2/1948 | Summers | 123/32 SP |
| 3,102,521 | 9/1963 | Slemmons | 123/32 SP |
| 3,230,939 | 1/1966 | Goossak | 123/32 SP |
| 3,270,721 | 9/1966 | Hideg | 123/32 SP |

*Primary Examiner*—Charles J. Myhre
*Assistant Examiner*—Ronald B. Cox
*Attorney, Agent, or Firm*—Lyon & Lyon

[57] ABSTRACT

A residual gas control apparatus for internal combustion engines of the type including a main combustion chamber connected through a torch passage to an auxiliary combustion chamber having a spark plug, the residual gas control including a partial partition dividing the auxiliary combustion chamber into a first zone exposed to the spark plug and a second zone exposed to the torch passage, there being openings connecting the two zones, the partition and openings serving to control the percentages of residual gas in the two zones so as to produce optimum ignition and reduce NOx generation, and also to minimize turbulence in the vicinity of the spark plug.

6 Claims, 4 Drawing Figures

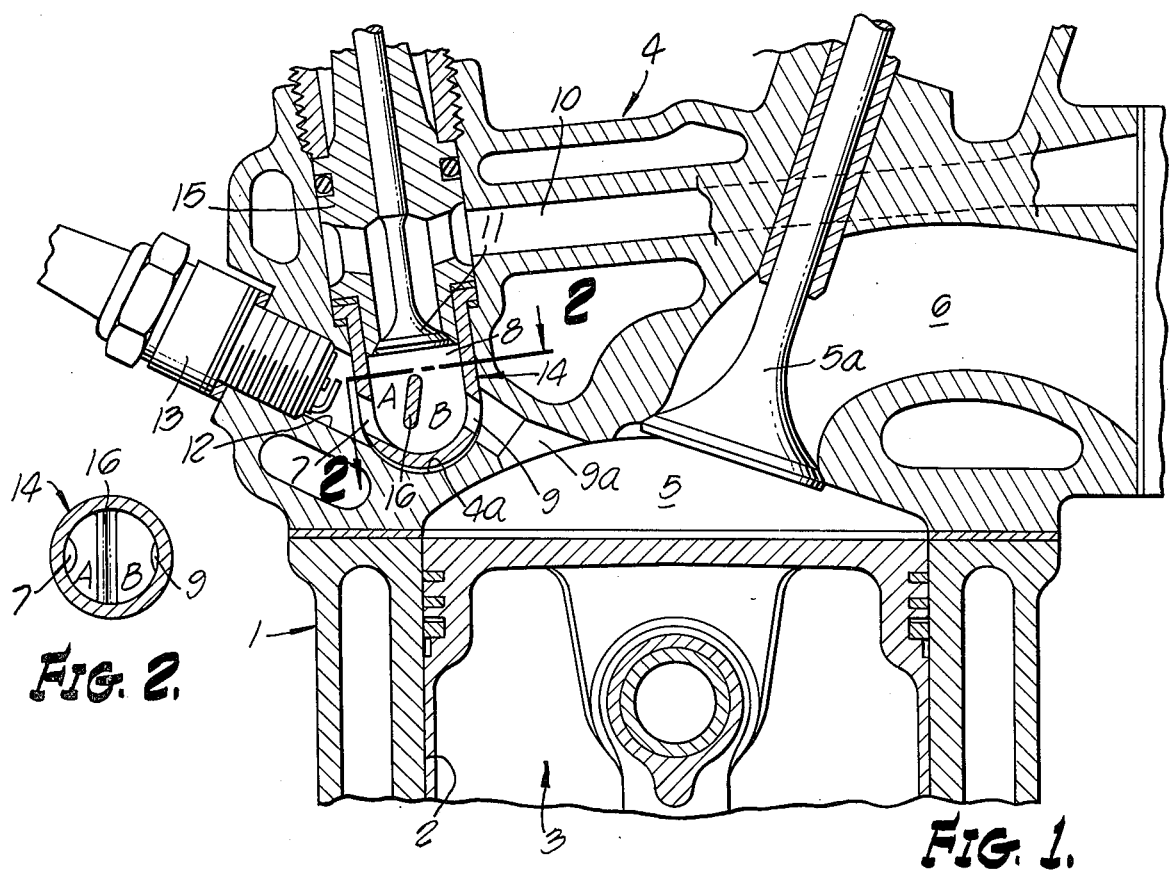
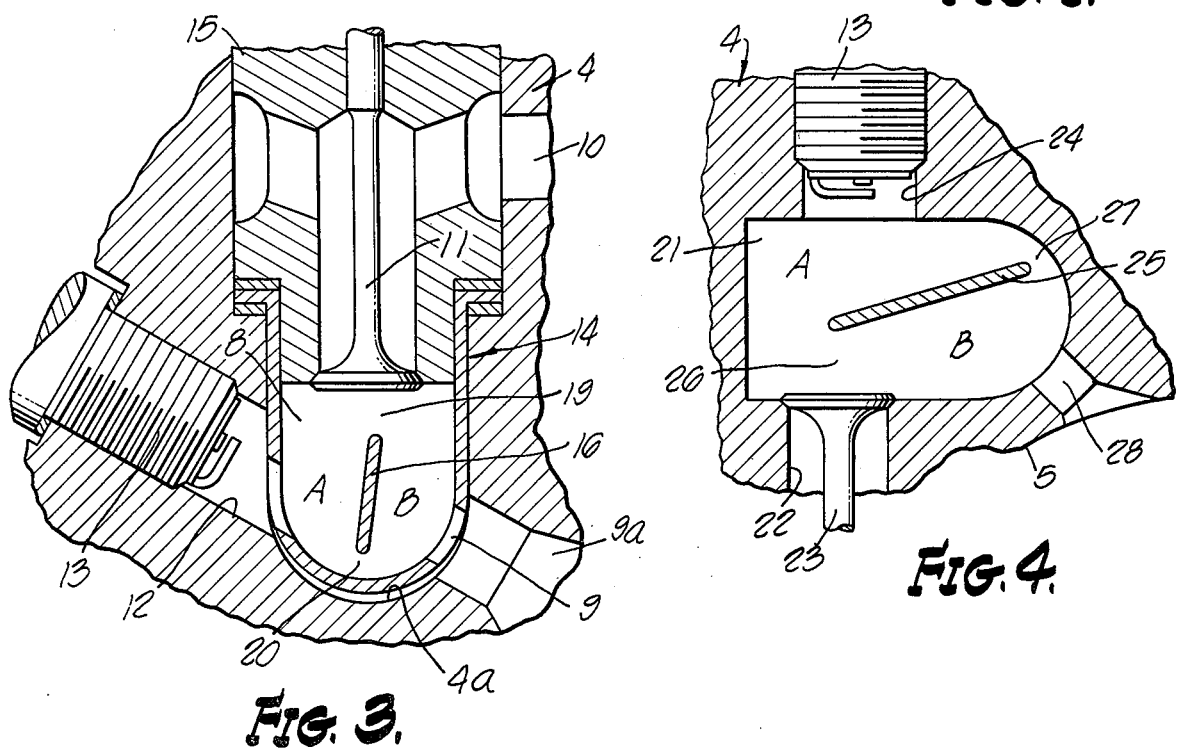

RESIDUAL GAS CONTROL APPARATUS FOR INTERNAL COMBUSTION ENGINES HAVING AUXILIARY COMBUSTION CHAMBERS

This invention relates to internal combustion piston engines of the type more fully disclosed in U.S. Pat. application Ser. No. 353,786 filed Apr. 23, 1973, now U.S. Pat. No. 3,890,942 such engines having one or more main combustion chambers, each connected by means of a torch passage to a corresponding auxiliary combustion chamber. A rich mixture supplied to the auxiliary combustion chamber is ignited by a spark plug to provide a flame which is projected through the torch passage to burn a relatively lean mixture in the main combustion chamber. Each main chamber is provided with an intake valve and an exhaust valve and each auxiliary chamber is provided with an intake valve. Accordingly, engines of this type are known as three-valve engines. The valves are opened and closed in timed sequence by conventional cam mechanisms.

This type of engine is capable of using a mixture, the overall air-fuel ratio of which is leaner than a stoichiometric mixture. However, although the quantity of mixture in the auxiliary combustion chamber is much smaller than the quantity in the main combustion chamber, its mixture is richer so that the amount of $NO_x$ generated in the auxiliary combustion chamber is relatively large in spite of the fact that its volume is small.

Residual gas, that is, gas remaining in the auxiliary combustion chamber, and main combustion chamber after completion of the exhaust stroke is mixed with the incoming air-fuel mixture during the intake stroke. A major portion of the residual gas in the auxiliary combustion chamber is forced by the incoming rich mixture to move therefrom into the main combustion chamber and a part of the rich mixture also flows into the main chamber.

It is desirable in order to reduce $NO_x$ generation, that the ratio of residual gas to the rich mixture in the auxiliary combustion chamber at time of ignition be larger than the ratio normally existing. On the other hand presence of residual gas in excess of a needed ratio not only causes poor ignition of the mixture, but also causes residual gas to jet into the main combustion chamber causing insufficient combustion of the lean mixture therein and possibly causing an increase in the amount of HC and CO emissions.

During the compression stroke, part of the rich mixture which flowed from the auxiliary combustion chamber into the main combustion chamber as well as part of the lean mixture from the main combustion chamber flows backward into the auxiliary combustion chamber under compression. Such backflowing gas can at the time of ignition, produce an excessively strong turbulence in the vicinity of the electrode which makes dependable ignition difficult.

The present invention is directed to a residual gas control apparatus which is capable of reducing the amount of $NO_x$, HC and CO emissions by lowering the peak combustion temperature and by increasing the combustion time.

More particularly, a partition is provided in the auxiliary combustion chamber which divides the chamber into a first zone exposed to the spark plug and a second zone exposed to the torch passage, the zones being connected by passageways so arranged as to receive portions of the rich mixture supplied to the auxiliary combustion chamber.

Further, the arrangement of partition and passageways are such that an optimum ratio of residual gas and fresh charge of mixture is created in the first zone for initial ignition with minimal production of $NO_x$, and an optimum richer mixture of fresh charge of mixture to residual gas is created in the second zone for ignition by the ignited mixture entering from the first zone. The resulting fully ignited mixture then discharges through the torch passage to effect full ignition of lean mixture in the main chamber with minimum generation of HC and CO emissions.

Still further, the novel arrangement of partition and passageways prevent strong turbulence in the vicinity of the spark plug electrode to insure uniform and complete initial ignition.

Still further, the sequential ignition increases the combustion time and improves the thrust on the piston, with reduction of peak temperatures.

DESCRIPTION OF THE FIGURES

FIG. 1 is a fragmentary sectional view of an internal combustion engine having an auxiliary combustion chamber including a residual gas control apparatus.

FIG. 2 is a transverse sectional view, taken through 2—2 of FIG. 1 of the hot cup or liner for the auxiliary combustion chamber showing the partition and combustion zones forming portions of the residual gas control apparatus.

FIG. 3 is an enlarged fragmentary sectional view of the auxiliary combustion chamber and the residual gas control apparatus.

FIG. 4 is a fragmentary sectional view diagrammatically showing a modified construction of the auxiliary of the auxiliary chamber and the residual gas control apparatus.

An internal combustion engine, which is suitable for use with a residual gas control apparatus includes a cylinder block 1 having one or more cylinders 2, each having a piston 3. The cylinder block is capped by a cylinder head 4, forming with each cylinder a main combustion chamber 5. The cylinder head 4 is provided with a main intake passage 6 for each main combustion chamber 5, the passage being controlled by a main intake valve 5a. An exhaust passage in the cylinder head 4 controlled by an exhaust valve, not shown, is provided for each main combustion chamber 5.

The cylinder head 4 is provided with a recess or cavity 4a for reception of a cup-shaped liner 14 defining an auxiliary combustion chamber 8 therein. Thus, an auxiliary combustion chamber 8 is provided for each main combustion chamber 5, and connected thereto through a torch passage 9 and aligned opening 9a. The cylinder head 4 is also provided with an auxiliary intake passage 10 for each auxiliary combustion chamber 8, controlled by auxiliary intake valve 11. Each auxiliary combustion chamber is provided with a port 7 aligned with a recess 12 which receives a spark plug 13. The cup-shaped liner 14 is formed of heat resisting metal such as stainless steel held in place by a suitable fitting 15 which supports and guides the intake valve 11.

The residual gas control apparatus includes a partition 16 interposed between the torch passage 9 and recess 12 dividing the auxiliary combustion chamber 8 into a first zone A confronting the recess 12 and its spark plug 13 and a second zone B confronting the torch passage 9. The two zones are connected by ports 19 and 20. The partition 16 is securely fixed to the inside wall of the liner 14 at its ends by welding which serves to transfer heat to the liner 14, thereby preventing the partition 16 from becoming an objectionable hot spot. The port 19 is located between one end of the partition and the auxiliary intake valve 11 and the port 20 is located between the other end of the partition 16 and the hemispherical bottom wall of the liner 14. The ends of the partition and rounded so that the effective area of each port may be accurately predetermined.

Now assuming that zone A is relatively small in volume as compared to zone B, the amount of residual exhaust gas remaining in zone A is minimal. This results in a high peak temperature, so that the percentage of $NO_x$ generated is increased. Now assuming that zone A is relatively large in volume, as compared to zone B, the fresh charge of the rich mixture flowing through zone B into the main combustion chamber is reduced thereby resulting in poor ignition of the lean mixture in the main combustion chamber. It has been found that the volume $V_A$ of zone A with respect to the volume Va of the whole auxiliary combustion chamber should be in the range:

$$V_A/Va = 0.25 \text{ to } 0.75$$

for optimum performance.

Port 19 between the partition 16 and the auxiliary intake valve 11 is constructed so that its effective area is sufficiently large, as not to give a throttle effect to the fresh charge of the mixture inducted through the auxiliary intake valve 11. The other port 20 is constructed so that its effective area is smaller than the port 19 so as to provide a throttle effect for restricting the flow inducted through the auxiliary intake valve and passing through zone A. Also the effective area of port 20 is made smaller than the effective area of the torch passage 9.

Operation of the residual gas control apparatus is as follows:

At completion of the exhaust stroke of the piston, the burned residual gas in the auxiliary combustion chamber 8 has a pressure of approximately one atmosphere. As the piston moves to its intake stroke, the main intake valve 5a opens to allow a lean mixture to be inducted into the main combustion chamber 5, and the auxiliary intake valve 11 opens to allow a rich mixture to be inducted into the auxiliary combustion chamber 8. The mixture inducted into the auxiliary combustion chamber 8 is divided into two streams by the partition 16 to mix with the burned residual gas remaining in the zones A and B respectively.

Since the effective area of port 20 is smaller than that of the port 19, the flow of residual gas from zone A to zone B is restricted while a fresh charge of the mixture into zone A is also restricted. As a result, the burned residual gas tends to remain in zone A.

In contrast to this, the portion of the fresh charge of the mixture passing into zone B forces the burned residual gas therein to be diffused into the main chamber 5 through the torch passage 9, accompanied by flow from zone A through the smaller port 20. The discharge from the torch passage 9 mixes with the lean mixture which is being inducted at the same time into the main combustion chamber 5. As a result, a localized region containing a mixture of moderate richness is formed in the main chamber 5 in the neighborhood of the torch passage 9.

Therefore at the end of the intake stroke, zone A is filled with a fresh charge of a mixture containing a relatively large amount of residual gas and zone B is filled with a fresh charge of a mixture containing little residual gas.

As the piston moves to its compression stroke, part of the moderate mixture within the main combustion chamber flows backward from the main combustion chamber 5 through the torch passage 9 into the auxiliary combustion chamber 8 and mixes with the mixture containing the residual gas in zone B first and then through passages 19 and 20 into the zone A to dilute with the mixture therein that contains the residual gas. However, the partition 16 prevents the mixture that flows backward through the torch passage from impinging directly on the spark plug 13, so that quiescent mixture in zone A in the neighborhood of the spark plug is essentially undisturbed. Thus, at the end of the compression stroke, a quiescent mixture with an air-fuel ratio suitable for ignition is formed in the neighborhood of the spark plug electrode, while a gradation of mixture concentrations is formed the tendency of which is such that its air-fuel ratio becomes richer and richer from the neighborhood of torch passage 9 toward the neighborhood of the spark plug 13. Furthermore a gradation of residual gas concentrations is formed the tendency of which is such that its concentration becomes smaller and smaller from the neighborhood of the spark plug toward the neighborhood of the torch passage.

At the same time, the remaining portion of the moderate mixture region in the main combustion chamber 5 near the torch passage 9 remains in that position and is richer than the remaining lean mixture in the main combustion chamber.

The compressed mixture in the zone A with air-fuel ratio suitable for ignition is first ignited by the spark plug and the resulting flame travels through the passages 19 and 20 into zone B to ignite and burn the mixture existing therein. In this case, at the time of spark ignition, the amount of residual gas remaining in zone A is not so great as to be a hindrance to the ignition also the mixture in the zone B contains the optimum residual gas. As a result, the peak combustion temperature in both zone A and B are lowered and the amount is $NO_x$ generation of reduced.

When flame is projected from the zone B into the main combustion chamber 5 through the torch passage 9 by virtue of the presence of the partition 16 the flame travels slowly to ignite the mixture of moderate richness in the main combustion chamber 5 in the neighborhood of the torch passage 9. The flame then spreads to burn a lean mixture in the main combustion chamber 5. The lean mixture burns with a low peak temperature and continues to burn slowly throughout the expansion stroke and beyond at a relatively high and prolonged mean temperature. Therefore, although without a high peak temperature, a relatively high and prolonged temperature minimizes generation of unburned hydrocarbon in the exhaust gas and by virtue of excessive oxygen in the main combustion chamber, oxidizes the greater part of carbon monoxide to carbon dioxide, and furthermore is capable of achieving, due to its low peak temperature, the reduction of $NO_x$.

Referring to the modification of FIG. 4, an auxiliary combustion chamber 21 is shown as extending laterally but essentially in the same relation to the main combustion chamber 5 as the first described embodiment and connected thereto by the torch passage 9. In this embodiment no liner is shown, and an upward extending auxiliary intake passage 22 is closed by the auxiliary intake valve 23. A spark plug recess 24 receives the spark plug 13.

As in the first embodiment a partition 25 is provided forming a major port 26 above the valve 23, and slopes upwardly to form a minor port 27 above the torch passage 28. A first zone A is formed above the partition 25 confronting the spark plug 13, and a second zone B is formed below the partition confronting the torch passage 28. The partition 25 is securely fixed to the inside wall of the auxiliary chamber 21 at its ends by welding, or one-piece casting.

Operation of this embodiment is essentially the same as the first described embodiment.

Having fully described our invention it is to be understood that we are not to be limited to the details herein set forth, but that our invention is of the full scope of the appended claims.

We claim:
1. Residual gas control apparatus for a four cycle internal combustion piston engine having a main combustion chamber and an auxiliary combustion chamber connected by torch passage means, a valve controlled main intake passage for delivering a lean mixture to the main combustion chamber, and a valve controlled auxiliary intake passage for delivering a rich mixture to the auxiliary combustion chamber, operation of the engine causing entrapment of burned residual gas in the auxiliary chamber at the end of each exhaust stroke, the improvement comprising, in combustion: an ignitor adjacent the auxiliary combustion chamber, means dividing the auxiliary combustion chamber into a first zone confronting the ignitor and a second zone confronting the torch passage means, and port means communicating between the zones, the zones being so proportioned and the port means being so arranged as to produce a readily ignitable rich mixture diluted by residual gas in the first zone, and a less diluted rich mixture in the second zone, the port means providing controlled ignition progress from the first zone to the second zone and through the torch passage means into the main combustion chamber, said port means including a first port disposed adjacent the auxiliary intake valve and a second port remote therefrom.

2. Residual gas control apparatus as defined in claim 1, wherein the first port is larger than the second port and permits induction of the rich mixture into both of the zones.

3. Residual gas control apparatus as defined in claim 1, wherein the volume of the first zone divided by the combined volume of both zones is in the range between 0.25 and 0.75.

4. Residual gas control apparatus as defined in claim 1, wherein the contents in the first zone are substantially isolated from the flow between the auxiliary intake passage and the main combustion chamber thereby maintaining the contents in a less agitated state than in the second zone, to facilitate uniform ignition.

5. Residual gas control apparatus for a four cycle internal combustion piston engine having a main combustion chamber and an auxiliary combustion chamber connected by torch passage means, a valve controlled main intake passage for delivering a lean mixture to the main combustion chamber, and a valve controlled auxiliary intake passage for delivering a rich mixture to the auxiliary combustion chamber, operation of the engine causing entrapment of burned residual gas in the auxiliary chamber at the end of each exhaust stroke, the improvement comprising, in combination: an ignitor adjacent the auxiliary combustion chamber, a partition dividing the auxiliary combustion chamber into a first zone confronting the ignitor and a second zone confronting the torch passage means, and port means communicating between the zones, the zones being so proportioned and the port means being so arranged as to produce a readily ignitable rich mixture diluted by residual gas in the first zone, and a less diluted rich mixture in the second zone, the port means including a first larger port between the partition and the auxiliary intake valve, and a second smaller port between the two zones at the end of the partition remote from the auxiliary intake valve, the port means providing controlled ignition progress from the first zone to the second zone and through the torch passage means into the main combustion chamber.

6. Residual gas control apparatus as defined in claim 5, wherein the ignitor and auxiliary intake valve are disposed at opposite sides of the auxiliary chamber and the dividing means is a partition extending therebetween.

* * * * *

UNITED STATES PATENT AND TRADEMARK OFFICE
CERTIFICATE OF CORRECTION

PATENT NO. : 3,987,765
DATED : October 26, 1976
INVENTOR(S) : YASUHITO SATO et al It is certified that error appears in the above-identified patent and that said Letters Patent are hereby corrected as shown below:

Column 2, line 36, at beginning of line delete "of the auxiliary" and insert --combustion--.

Column 3, line 9, change "and rounded" to read --are rounded--.

Claim 6, lines 1 and 2, change "claim 5" to read --claim 1--.

Signed and Sealed this

Twenty-fifth Day of January 1977

[SEAL]

Attest:

RUTH C. MASON
*Attesting Officer*

C. MARSHALL DANN
*Commissioner of Patents and Trademarks*